US009561632B2

(12) United States Patent
Hume

(10) Patent No.: US 9,561,632 B2
(45) Date of Patent: Feb. 7, 2017

(54) METHOD FOR FORMING AN ELONGATE SUPPORT STRUCTURE

(75) Inventor: Tamas Dale Hume, Victoria (AU)

(73) Assignee: Vijay Investments Pty Ltd., Victoria (AU)

(*) Notice: Subject to any disclaimer, the term of this patent is extended or adjusted under 35 U.S.C. 154(b) by 543 days.

(21) Appl. No.: 14/111,469

(22) PCT Filed: Apr. 11, 2012

(86) PCT No.: PCT/AU2012/000371
§ 371 (c)(1),
(2), (4) Date: Nov. 11, 2013

(87) PCT Pub. No.: WO2012/139160
PCT Pub. Date: Oct. 18, 2012

(65) Prior Publication Data

US 2014/0054820 A1 Feb. 27, 2014

(30) Foreign Application Priority Data

Apr. 11, 2011 (AU) ................................ 2011901350

(51) Int. Cl.
*B28B 21/60* (2006.01)
*B29D 99/00* (2010.01)
(Continued)

(52) U.S. Cl.
CPC ........... *B29D 99/0003* (2013.01); *B28B 21/38* (2013.01); *B28B 21/60* (2013.01); *B28B 23/06* (2013.01)

(58) Field of Classification Search
None
See application file for complete search history.

(56) References Cited

U.S. PATENT DOCUMENTS 3,652,756 A * 3/1972 Buren ....................... E04C 5/08 264/228
7,137,800 B1 11/2006 Longo
(Continued)

FOREIGN PATENT DOCUMENTS

GB 191100086 8/1911
GB 289787 * 7/1928
(Continued)

OTHER PUBLICATIONS

International Search Report and Written Opinion dated May 11, 2012.
(Continued)

*Primary Examiner* — Edmund Lee
(74) *Attorney, Agent, or Firm* — Hovey Williams LLP

(57) ABSTRACT

A method for forming an elongate support structure having a central hollow portion is disclosed including arranging an elongate core member to extend horizontally and then forming a core assembly by locating a first tensioning member at a first end where the first tensioning member including tensioning elements extending from the first end of the core member along the outside of the core member to a second tensioning member located at the second end of the core member. An external mold assembly is attacked to the core assembly between the first and second tensioning members to form a combined mold and core assembly and to also form a cavity extending around and along the central core member through which the plurality of tensioning elements extend. The tensioning elements are then tensioned and the combined mold and core assembly is then positioned in an upright orientation and concrete injected into the cavity formed between the elongate core member and the external mold assembly.

13 Claims, 9 Drawing Sheets

(51) Int. Cl.

| | |
|---|---|
| ***B28B 21/38*** | (2006.01) |
| ***B28B 23/06*** | (2006.01) |

(56) References Cited

U.S. PATENT DOCUMENTS

| | | | | |
|---|---|---|---|---|
| 2003/0010969 | A1* | 1/2003 | Crissey | E04C 3/34 256/19 |
| 2005/0156345 | A1 | 7/2005 | Hume | |

FOREIGN PATENT DOCUMENTS

| | | | |
|---|---|---|---|
| GB | 1504905 | A | 3/1978 |
| GB | 2227036 | A | 7/1990 |
| WO | WO8602875 | A1 | 5/1986 |

OTHER PUBLICATIONS

Extended European Search Report and prior art cited; dated Jan. 28, 2015.

* cited by examiner

METHOD FOR FORMING AN ELONGATE SUPPORT STRUCTURE

PRIORITY DOCUMENTS

The present application claims priority from Australian Provisional Patent Application No. 2011901350 entitled "METHOD AND SYSTEM FOR FORMING A SUPPORT STRUCTURE" and filed on 11 Apr. 2011 whose contents are hereby incorporated by reference in their entirety.

TECHNICAL FIELD

The present invention relates to forming a hollow support structure. In a particular form, the present invention relates to forming a hollow support structure made from concrete for use as a pole in applications such as traffic and street lights, road signage and power transmission.

BACKGROUND

Circular hollow concrete poles are well known in applications ranging up to 30 meters in length. A process for constructing these hollow poles involves a spinning process where centrifugal force is used to spread a wet concrete mixture over the inner surface of a horizontally arranged mould. Concrete is fed into the slowly revolving mould which is then spun, squeezing out surplus water and evenly spreading compacted concrete over the inner surface.

While this method of forming hollow concrete poles has the benefit that the concrete wall of the pole is both dense and strong as a result of the centrifugal spinning action there are a number of serious drawbacks to this process. The first disadvantage is the lack of uniformity of wall thickness of the pole which can vary from one pole to another. The spinning process first involves the concrete being placed in the mould before it has been fully assembled. It is then left to an operator to decide precisely how much concrete is placed in any particular part of the mould which can lead to a degree of variability.

Where the pole is tapered, which is required in many standard applications such as a telecommunications or power transmission pole, when the mould is spun the concrete will not always relocate around and along the mould uniformly. In these circumstances, the concrete will as a result of the centrifugal force be distributed along the tapered profile to the place of least resistance at the thicker end of the mould. This results in a pole that will not have a uniform bending capacity because of the variation in wall thickness. Where the spinning process is used in combination with a prestressing process, the variation in thickness is likely to also cause the pre-stressed pole to distort immediately once it is removed from the mould.

A further and significant problem with a spun pole is the advent of a thick layer of laitance on the inner surface of the finished product. This layer is highly absorbent and can cause ground water to move up the inside surface of the pole and into the concrete. If this water contains any salt, the pH of the concrete will be reduced, thereby causing corrosion of any reinforcement of the pole.

SUMMARY

In a first aspect, the present invention accordingly provides a method for forming an elongate support structure, the support structure having a central hollow portion, the method including:

arranging an elongate core member to extend substantially horizontally, the core member sized and shaped to correspond with the central hollow portion of the elongate support structure;

forming a core assembly by locating at a first end of the elongate core member a first tensioning member, the first tensioning member including a plurality of tensioning elements extending from the first end of the core member along the outside of the core member to a second tensioning member located at the second end of the core member, attaching an external mould assembly to the core assembly between the first and second tensioning members to form a combined mould and core assembly, the external mould assembly being sized and shaped to form a cavity extending around and along the central core member through which the plurality of tensioning elements extend through;

tensioning the plurality of tensioning elements between the first and second tensioning members;

positioning the combined mould and core assembly to a substantially upright orientation; and injecting concrete into the cavity formed between the elongate core member and the external mould assembly to form the elongate support structure.

In another form, attaching the external mould assembly includes first increasing the distance between first and second tensioning members with respect to each other by applying a separating force to provide a space between the first and second tensioning members to attach the external mould assembly.

In another form, the applying of a separating force also straightens the tensioning elements between the first and second tensioning members.

In another form, the concrete is injected from the bottom of the combined mould and core assembly.

In another form, the tensioning of the plurality of tensioning elements involves tensioning with respect to the first tensioning member acting as a dead end with respect to a live end corresponding to the location of the second tensioning member.

In another form, the external mould assembly bears the compressive load caused by tensioning the plurality of tensioning elements.

In another form, the step of forming a core assembly includes threading a reinforcing cage structure onto the elongate core member located between the first and second tensioning members.

In another form, the tensioning elements extend along the elongate core member external to the reinforcing cage structure.

In another form, the reinforcing cage structure includes one or more fittings to provide attachment points on the formed elongate support structure.

In another form, the method further includes arranging a reinforcing member along the elongate core member.

In another form, the reinforcing member is a helical wire that is extended along the elongate core member.

In another form, the helical wire is extended external to the tensioning elements.

In another form, the elongate support structure is a cylindrical pole and the central hollow portion is cylindrical.

In another form, the elongate support structure is tapered.

In another form, the method includes the step of after injecting concrete into the cavity the elongate core member is partially removed from the combined mould and core assembly.

In a second aspect, the present invention accordingly provides an elongate support structure formed by the method in accordance with the first aspect of the present invention.

In a third aspect, the present invention accordingly provides a combined mould and core assembly for forming an elongate support structure, the support structure having a central hollow portion, the mould and core assembly including:

- a core assembly including an elongate core member sized and shaped to correspond with the central hollow portion of the elongate support structure, the core assembly further including a first tensioning member, the first tensioning member located at one end of the elongate core member and including a plurality of tensioned elements extending from the first end of the core member along the outside of the core member to a second tensioning member located at a second end of the core member; and
- an external mould assembly attached to the core assembly between the first and second tensioning members, the external mould assembly being sized and shaped to form a cavity for the injection of concrete extending around and along the central core member through which the plurality of tensioned elements extend through.

In another form, the external mould assembly bears the compressive load resulting from tensioning the tensioned elements.

In another form, the combined mould and core assembly further includes a reinforcing cage extending along the elongate core member.

In another form, the combined mould and core assembly further includes a reinforcing member in the form of a helical wire extending along the elongate core member.

In a fourth aspect, the present invention accordingly provides a method for producing a hollow concrete pole having reduced laitance, the method including:

- forming a combined mould and core assembly having a core member corresponding to a hollow portion of the concrete pole and an external mould providing a moulding region surrounding the core member corresponding to the wall of the concrete pole;
- orienting the combined mould and core assembly in an upright configuration; and
- injecting concrete into the moulding region.

In another form, the combined mould and core assembly are oriented in a vertical configuration.

BRIEF DESCRIPTION OF DRAWINGS

Illustrative embodiments of the present invention will be discussed with reference to the accompanying drawings wherein.

In the following description, like reference characters designate like or corresponding parts throughout the figures.

DESCRIPTION OF EMBODIMENTS

Figure 1:
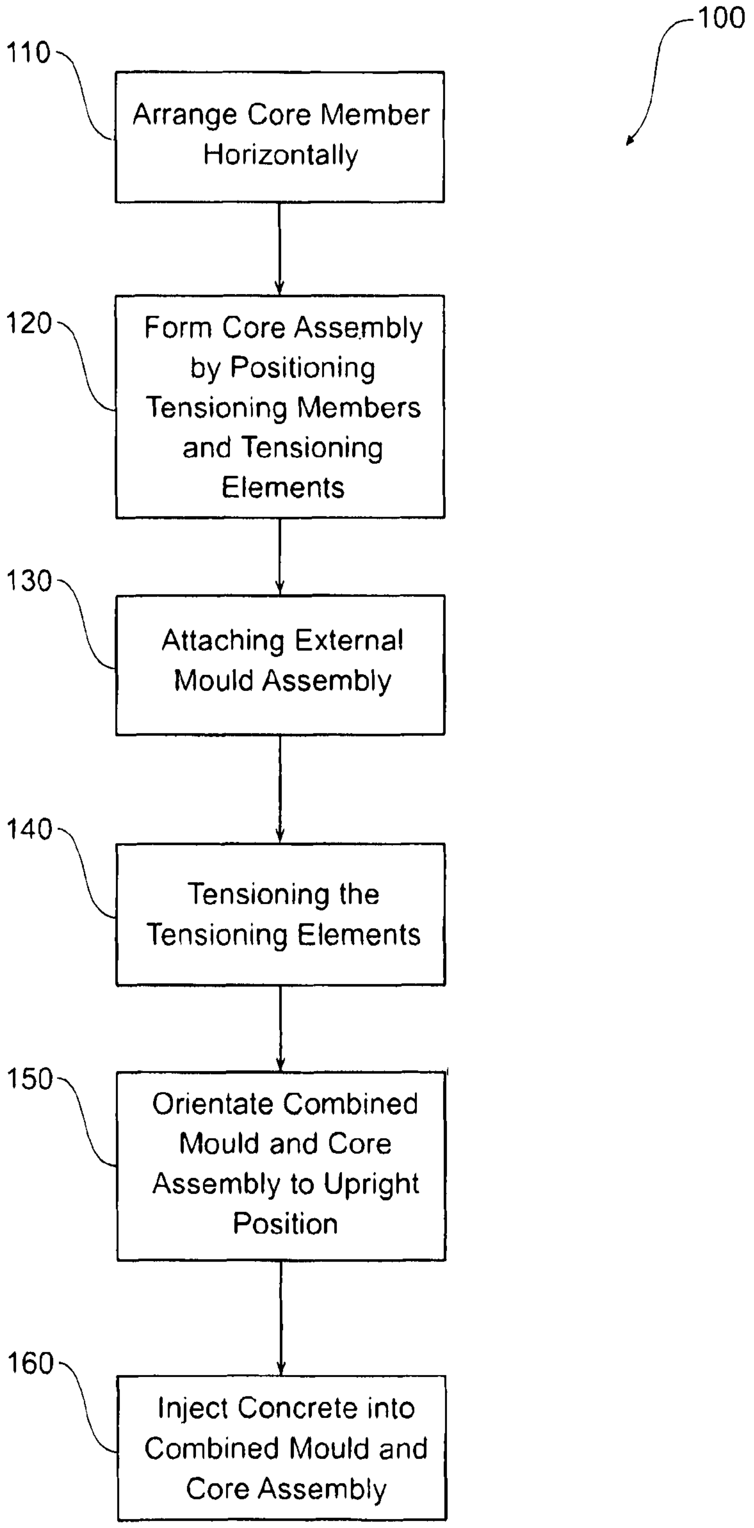
FIG. 1 is a system flowchart diagram of a method for forming an elongate support structure in accordance with an illustrative embodiment of the present invention.

Referring now to FIG. 1, there is shown a system flowchart diagram 100 of a method for forming an elongate support structure having a central hollow portion according to an illustrative embodiment of the present invention. In this illustrative embodiment, the method is directed to the formation of a tapered generally cylindrical concrete pole suitable for the carrying of electrical or telecommunication cables and includes steps 110 and following to step 160.

Figure 2:
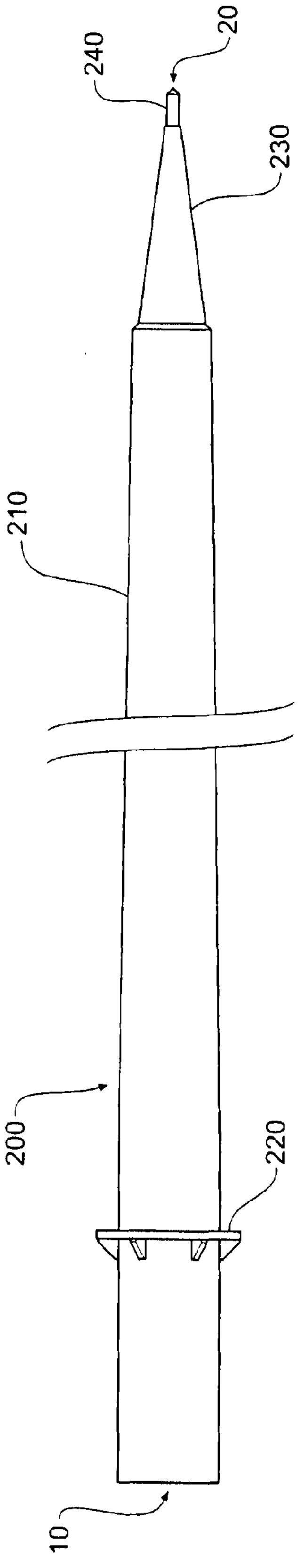
FIG. 2 is a side sectional view of an elongate core member employed in the method for forming an elongate support structure as illustrated in FIG. 1.

Referring now also to FIG. 2, at step 110 an elongate core member 200 having a size and shape corresponding to the central hollow portion of the formed concrete pole 2000 (see FIG. 14) is arranged to extend generally horizontally. In this illustrative embodiment, elongate core member 200 is formed from steel and has a body 210 having a generally cylindrical configuration including a mounting flange 220 at a first end and at an opposed end a first tapered region 230 eventually terminating in a pointed tip or mounting spigot 240. In this illustrative embodiment, the formed concrete pole 2000 is 14 meters long with a tip size of 240 mm tapering at 15 mm/1000 mm.

As would be appreciated those of ordinary skill in the art, other core member configurations may be employed depending on the desired geometry and configuration of the resulting support structure. While in this illustrative embodiment both the core and pole geometry are both generally cylindrical, equally the external configuration of the structure may be different to the configuration of the hollow portion. As one non limiting example, the internal hollow portion may have a generally elliptical cross section while the external cross section of the pole may have a generally octagonal cross section.

Figure 3:
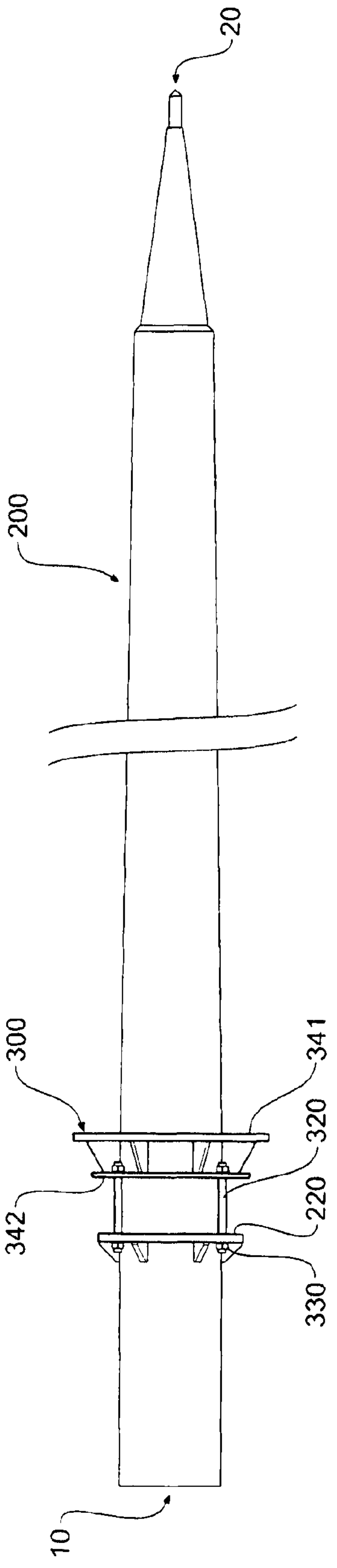
FIG. 3 is a side sectional view of the elongate core member illustrated in FIG. 2 with a first tensioning member attached at one end.
Figure 4:
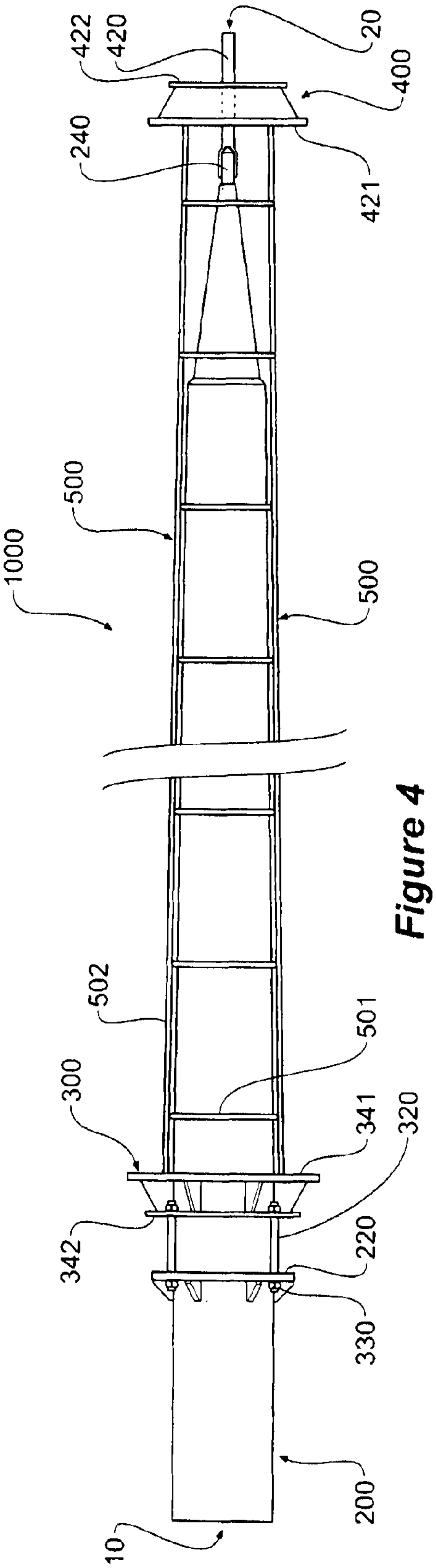
FIG. 4 is a side sectional view of a core assembly consisting of the elongate core member illustrated in FIG. 3 with a second tensioning member attached at the opposed end and tensioning elements extending between the first and second tensioning members and an additional cage structure surrounding the tensioning elements.

Referring now to FIGS. 3 and 4, at step 120 a core assembly 1000 is formed as follows. A first tensioning member in the form of a barrel collar 300 is threaded up elongate core member 200 from the opposed end and then attaching to mounting flange 220. Barrel collar 300 is of a generally open cylindrical configuration and includes a first inner abutment flange 341 and an intermediate flange 342 from which four pin members 320 extend towards the mounting flange 220 of elongate core 200 to be attached by bolting arrangement 330. In this illustrative embodiment, the barrel collar or first end 10 of the core member 200 is the "dead end" of the tensioning or pre-stressing arrangement.

Figure 6:
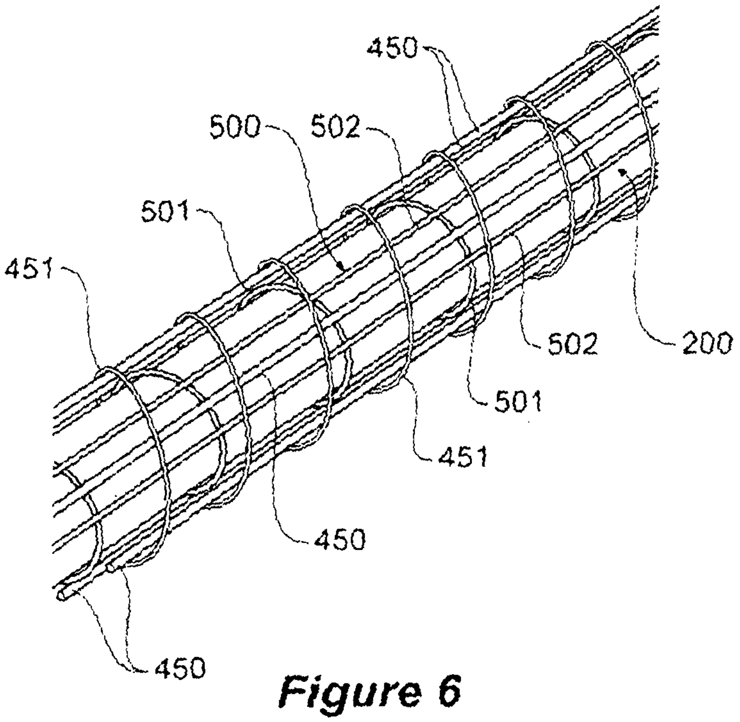
FIG. 6 is a perspective view of the core assembly depicting the tensioning elements extending along the core member and the cage structure surrounding the core member and tensioning elements.

In order to provide further reinforcing to the formed concrete pole 2000, in this illustrative embodiment an annular shaped cage structure 500 formed of steel and stainless steel is positioned over the core member 200 (see also FIG. 6). Cage structure 500 comprises a number of hoops 501 spaced along the elongate core 200 that have longitudinal bars 502 welded to the hoops 501 to form the cage structure 500. The cage structure 500 also has a number of additional fittings included to provide attachment points (not shown) for fixtures that are used in the Commissioning of the pole.

These fixtures include earthing ferules located on the pole for the grounding of any equipment located on the pole and furthermore step inserts for screw in steps to allow access up the pole. Cage structure 500 also aids in holding core member 200 centrally during the casting process. As best seen in FIG. 6, cage structure 500 may be positioned over the elongate core 200 using a lifting device such as a gantry crane or the like.

In order to fit the second tensioning member 400, first arbor member 420 is fitted to the tip or mounting spigot 240 of core member 200, thereby extending the length of the core member 200. Arbor member 420 functions to hold centrally a second tensioning member in the form of spigoted arbor housing 400 with respect to the core member 200 during the assembly process. Arbor housing 400 consists of an inner abutment flange 421 that on assembly will abut against the outer mould assembly 600 and an outer flange 422 that functions as a mounting plate for locking sleeves 430 that receive the tensioning elements 450. The arbor member 420 is later able to be removed and the remaining void is then used as an inlet port to inject concrete.

A further arbor extension member (not drawn) is also initially fitted to the end of arbor member 420 and provides a temporary extension to the core member 200 to aid assembly. One end of the arbor extension member threadably engages with the arbor member 420 and has an end shaped to support the spigoted arbor housing 400. In this illustrative embodiment, a further ligature coil 451 formed of continuous 5 mm diameter wire is positioned over the arbor member 420 prior to placement of the spigoted arbor housing 400. The ligature coil 451 is a pre-formed tapered helical wire coil that, once in position, functions as a further reinforcement member to the concrete by providing resistance to bursting during compression on bending of pole 2000.

The spigoted arbor housing 400 is then fitted onto the arbor extension member, thereby forming the "live end" 20 of the tensioning arrangement which in this illustrative embodiment will be tensioned with respect to the "dead end" 10 consisting of the barrel collar 300. Each of the tensioning elements or strands 450 is then threaded through the appropriate locking sleeve 430 located on the outer flange 422, and then through a corresponding aperture 423 in the inner abutment flange 421 of the spigoted arbor housing 400 and then further through the ligature coil 451 so that the ligature coil 451 is external to the tensioning strands 450.

Figure 8:
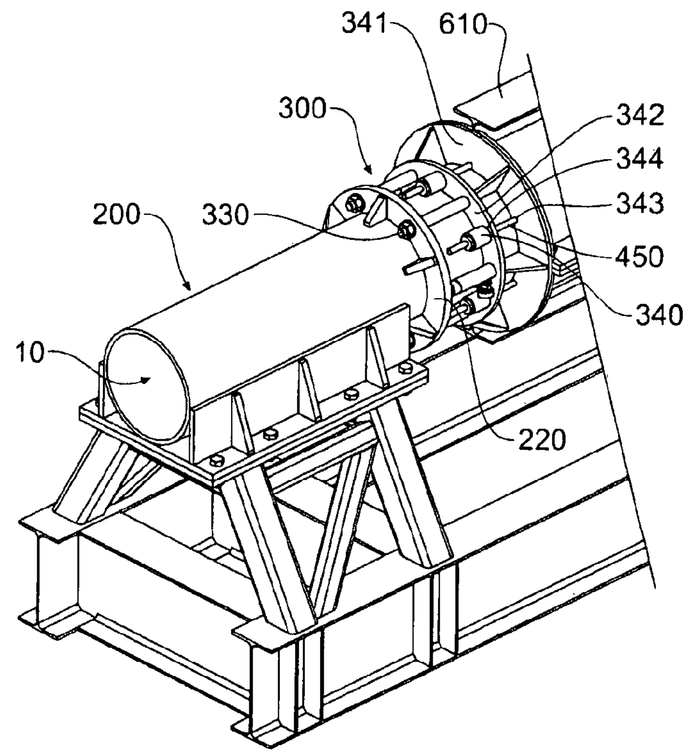
FIG. 8 is a perspective view of the "dead end" of the combined core and mould assembly, illustrated in FIG. 5.
Figure 9:
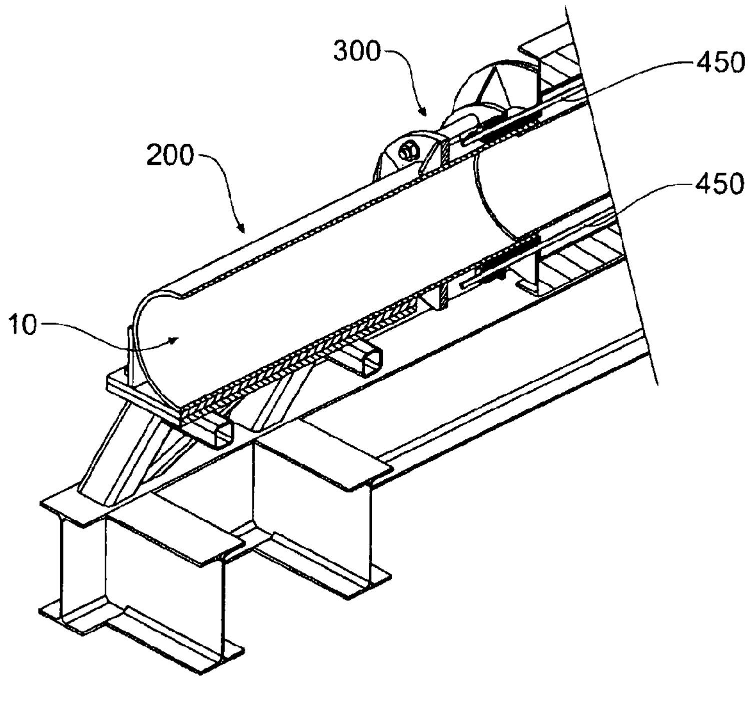
FIG. 9 is a sectional view of FIG. 8.
Figure 10:
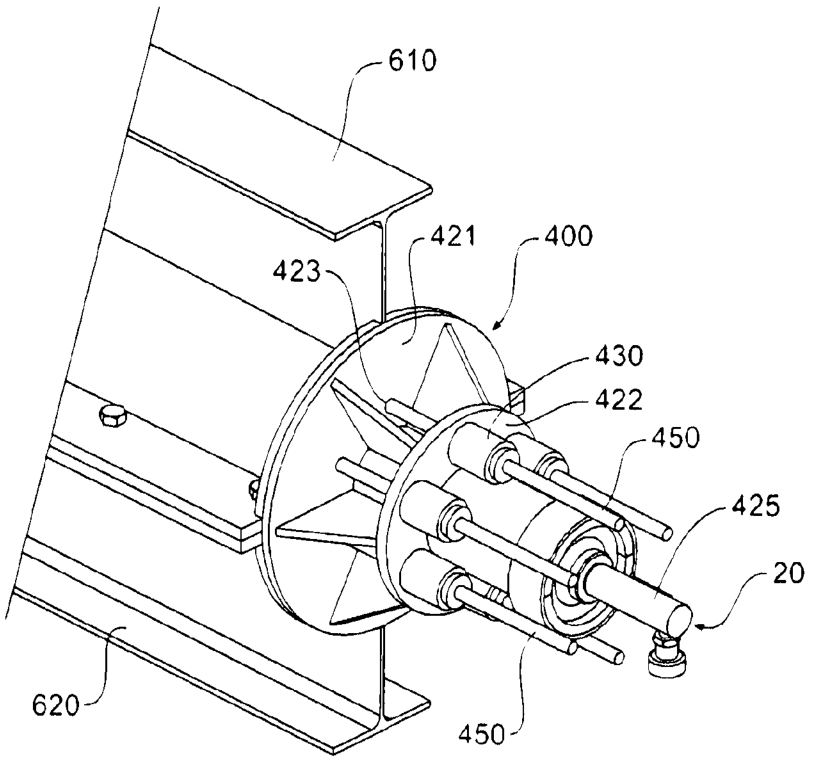
FIG. 10 is a perspective view of the "live end" of the combined core and mould assembly illustrated in FIG. 5.

The tensioning strands 450 are further extended along core member 200 external to cage structure 500 and then fed through the opposed corresponding apertures 343, 344 in the inner abutment flange 341 and intermediate flange 342 respectively of barrel collar 300 located at the opposite end of elongate core 200 (as best seen in FIG. 8). In this illustrative embodiment, six tensioning strands 450 are deployed around elongate core member 200.

Figure 11:
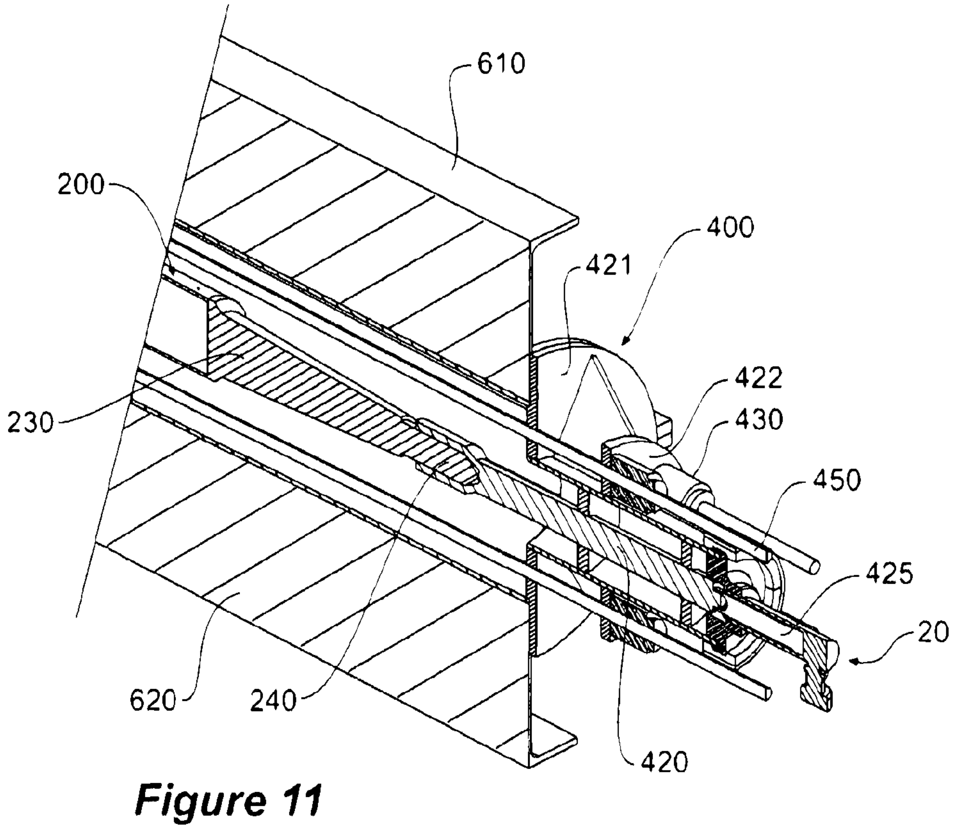
FIG. 11 is a sectional view of FIG. 10.
Figure 11A:
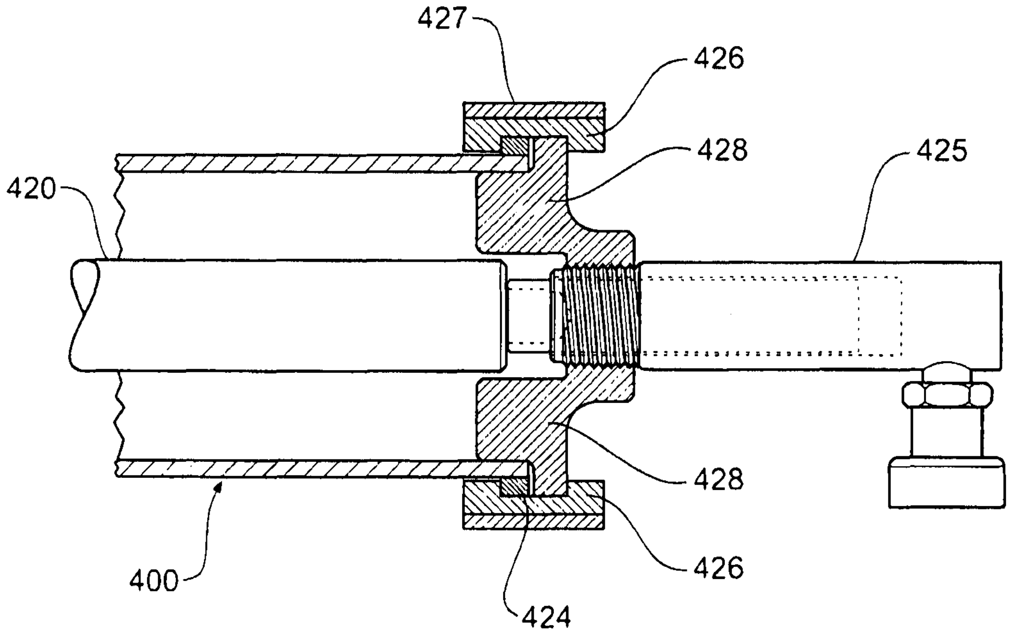
FIG. 11*a* is a part cross-section view of a spigoted jack housing attached to the spigoted arbor housing.

Referring now to FIG. 11*a*, spigoted arbor housing 400 is fitted over arbor member 420 and the arbor extension member may then be removed. Hydraulic jack 425 is then screwed to spigoted jack housing 428 which is attached to spigoted arbor housing 400 as shown in FIG. 11*a*. In this illustrative embodiment, spigoted arbor housing 400 incorporates a flange 424 and a split (i.e. two halves) shoulder ring 426 which locates over both the flange 424 and the housing 428 with the two halves of the shoulder ring 426 held together by retaining ring 427. Hydraulic ram 425 is then extended employing a hydraulic pump to engage the end of arbor member 420 to provide a separating force between the barrel collar 300 and spigoted arbor housing 400. Accordingly, the operation of hydraulic jack functions to increase the distance between spigoted arbor housing 400 and barrel collar 300 to be set at a dimension greater than the length of external mould assembly 600 to allow its attachment.

With the relative positions of barrel collar 300 and spigoted arbor housing 400 fixed by hydraulic jack 425 the six pre-stressing barrels & wedges 430 may be fitted with respect to tensioning elements 450. A light load of approximately 1 ton is then applied to the tensioning elements 450 by the use of the hydraulic jack 425. This light load ensures that the tensioning elements 450 are kept reasonably straight with respect to core member 200. Before removing the hydraulic line to jack 425, the input valve of the jack 425 is closed to ensure pressure is retained to maintain the separation force and hence extension distance between the spigoted arbor housing 400 and the barrel collar 300 i.e. between the first and second tensioning members.

Figure 5:
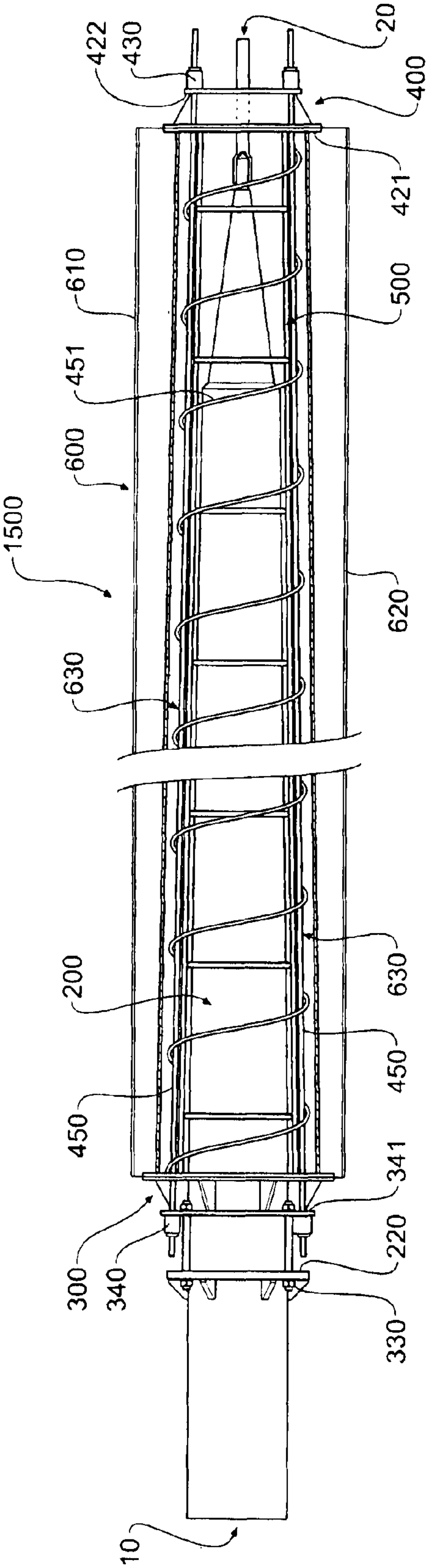
FIG. 5 is a side sectional view of the core assembly illustrated in FIG. 4 in combination with an external mould assembly to form a combined core and mould assembly.

The ligature wire 451 can now be drawn over the tensioning elements 450 from the spigoted arbor housing 400 to the barrel collar 300 forming an equally spaced spiral over the length of core member 200 (as best seen in FIG. 5) providing further reinforcement to the concrete to counter the bursting loads during bending as described previously. In other illustrative embodiments, ligature wire 451 may be more closely spaced in those regions of the pole where increased loads may be expected. In yet another illustrative embodiment, separate ligature wires 451 of different gauge may be utilised in different sections of the pole as required. This arrangement of the tensioning strands 450 extending along core member 200 external to the cage structure 500 but internal of the ligature coil 451 is best shown in FIGS. 5 and 6.

The ligature wire 451 is secured at each end to the cage structure 500. Nibs (not shown in the drawings) are welded to the cage structure 500 at intervals along its length and spaced around its circumference and function to hold the core assembly 1000 centrally within the external mould assembly 600. In this illustrative embodiment, each nib comprises a short rod which projects radially outwardly by an amount such to hold the core assembly 1000 concentrically within the mould assembly 600.

Referring now to FIG. 5, at step 130 an external mould assembly 600 is attached to core assembly 1000 between the first and second tensioning members in the form of barrel collar 200 and spigoted arbor housing 400 to form a combined mould and core assembly 1500. In this illustrative embodiment, external mould assembly 600 comprises an upper mould portion 610 and a lower mould portion 620 that are attached together and which are sized and shaped to form a cavity 630 extending around and along the central core member 200 through which the plurality of tensioning elements 450 extends through.

Figure 7:
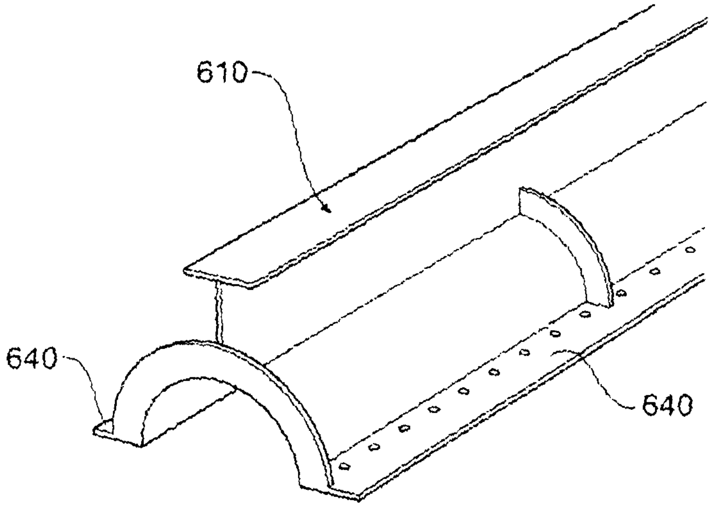
FIG. 7 is a front perspective view of an upper mould portion forming the top half of the external mould assembly illustrated in FIG. 5.

In this illustrative embodiment, core assembly 1000 is first placed in lower or subvert mould portion 620 where it is supported by the nibs to ensure correct spacing between the core member 200 and the lower mould portion 620. The upper or obvert mould portion 610 (as best shown in FIG. 7) is placed on the lower mould portion 620 and alignment dowels are use to align mould portions 610, 620. The mould is then closed along the two longitudinal joints 640 using a bolting arrangement spaced in this illustrative embodiment at 400 mm centres to form the combined mould and core assembly 1500. As would be appreciated by those skilled in the art, the joining arrangement for joining the mould portions 610, 620 will vary in accordance with the expected mass and volume of the pole being formed.

In one illustrative embodiment, mould portions 610, 620 may include fittings that are to be incorporated into the formed concrete pole 2000 that initially are fixed through apertures in the mould and which following casting can be detached from the mould portion to remain in the concrete pole 2000.

In order to facilitate the manufacturing process, the various casting components of the combined mould and core assembly 1500, such as the elongate core 200 and the external mould assembly 600, are sprayed with an industry standard release agent to facilitate release of the concrete pole and also to improve the surface finish of product.

The jack 425 which to this point is operating to maintain the extension between the arbor member 420 and barrel collar 300 may now be released. This allows the spigoted arbor housing 400 and barrel collar 300 to move towards and abut against the ends of the external mould assembly 600. Once the external mould assembly has been attached to the core assembly to form combined mould and core assembly 1500, the jack 425, shoulder ring housing 428, shoulder ring 426 and arbor member 420 may be removed from the spigoted arbor housing 400, thereby providing an inlet port for injection of concrete. At this stage, an alignment check is conducted to ensure that the spigoted arbor housing 400 and barrel collar 300 are in alignment with the top and bottom mould portions 610, 620. This is achieved by a series of location spigots on the mould portions 610, 620 to ensure alignment of the dead and live ends either side of the external mould assembly 600.

At step 140, the plurality of tensioning elements are tensioned between the first and second tensioning members by the use of a hydraulic jack that applies load to each tensioning element 450 progressively moving around the combined mould and core assembly 1500. In this illustrative embodiment, the first application of force should bring each tensioning element 450 up to half final load and a second load is then applied in the same progressive manner to raise the tension up to final pre-stressing load. In this illustrative embodiment, the final pre-stressing load applied to the tensioning elements 450 is 21 tonnes. Again, as would be appreciated by those of ordinary skill in the art the manner of application and extent of the pre-stressing load will vary according to the design and load requirements of the concrete pole being formed. Once the tensioning elements 450 are at the final pre-stressing load, the locking sleeves 340 and 430 may be locked off and any excess length of the tensioning element 450 then trimmed.

The resulting tension applied by the tensioning elements 450 to the spigoted arbor housing 400 and barrel collar 300 causes these components to abut and be compressed against either end of the top and bottom mould portions 610 and 620 resulting in the top and bottom mould portions 610 and 620 of external mould assembly 600 bearing the compressive load applied due to tensioning of the tensioning elements 450.

Alternatively, the spigoted arbor housing 400 and barrel collar 300 may be supported independently of the top and bottom moulds 610 and 620 of external mould assembly so that the load is not applied to them when tension is applied to the tensioning members 450.

Figure 12:
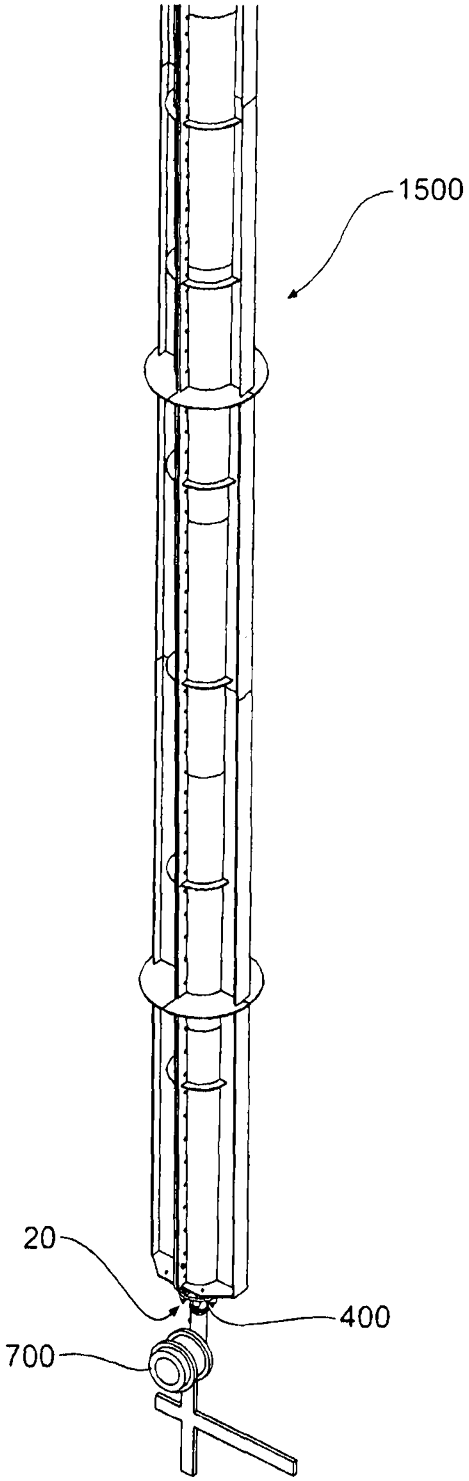
FIG. 12 is a front view depicting the combined core and mould assembly oriented in an upright direction prior to the injection of concrete.

At step 150, and as shown in FIG. 12, the combined mould and core assembly 1500 is then positioned to a substantially upright orientation in this case by using a crane arrangement. While in this illustrative embodiment, the combined mould and core assembly 1500 is raised to a substantially vertical position it may only be necessary depending on the application to position the assembly generally upright at an angle greater than or around 30 degrees to the horizontal.

At step 160, concrete is injected into the cavity 630 formed between the elongate core member 200 and the external mould assembly 600 to form the concrete pole. In this illustrative embodiment, a victaulic coupling, pump slide gate and elbow 700 is fitted to the bottom or live end 20 of the combined mould and core assembly 1500. While the concrete could be satisfactorily injected at any location along the combined mould and core assembly 1500, the applicant has found that there are a number of significant additional advantages to injecting concrete into the bottom of the assembly when it is an upright configuration.

The vertical configuration allows rising air to be dispersed to atmosphere at the to of the concrete rather than rising to the obvert mould surface where it can create voids in the concrete surface. The head generated also helps to further compress the concrete to reduce the amount of trapped air around the joints of the reinforcement cage 500.

The concrete mix employed in this illustrative embodiment is comprised of aggregate (stone), sand, general purpose cement, water and additives to promote anti-corrosive qualities, workability and early strength through accelerated curing. The combinations of the materials will vary from time to time based on the availability and quality.

Figure 13:
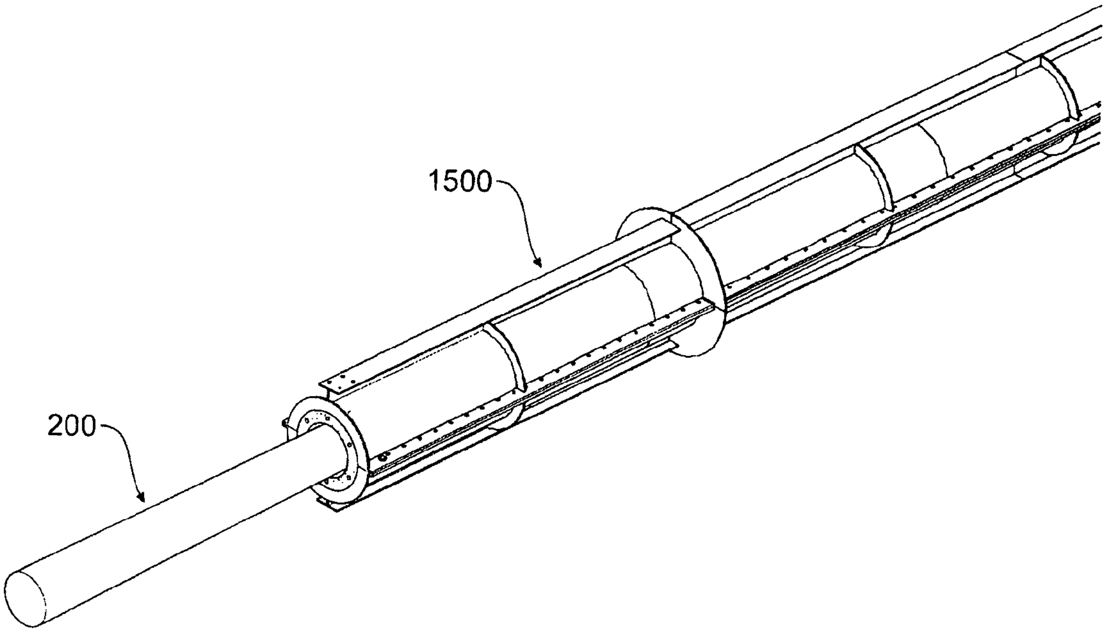
FIG. 13 is a front perspective view depicting the elongate core member being withdrawn from the combined core and mould assembly.

Referring now to FIG. 13, the combined mould and core assembly 1500 is lowered to a horizontal position either straight after pumping, 5-15 minutes or after initial hydration of the concrete which may be a time period of approximately 60-120 minutes. The elongate core 200 is then detached from barrel collar 300 by undoing bolting arrangement 330 and then partially removed to a distance of approximately 300 mm from assembly 1500 to reduce the risk of cracking in the formed concrete pole 2000. Hydraulic jacks may be positioned between the first inner abutment flange 341 and the intermediate flange 342 and used to ease the core 200 out of the mould and core assembly 1500.

A breather hole is drilled into the end of the concrete pole 2000 through the spigoted arbor housing 400. The concrete is relatively soft at this stage so the hole can easily be drilled by hand. The breather hole relieves any vacuum that would otherwise form as the core 200 is withdrawn. After a further time period of approximately 5 to 20 minutes which varies in accordance with the factors such as the ambient temperature and temperature of materials, the elongate core 200 is fully removed to be subsequently cleaned with high pressure water. Combined mould and core assembly 1500 now minus the elongate core member 200 is then placed in a steaming chamber for approximately two to three hours for final curing.

Figure 14:
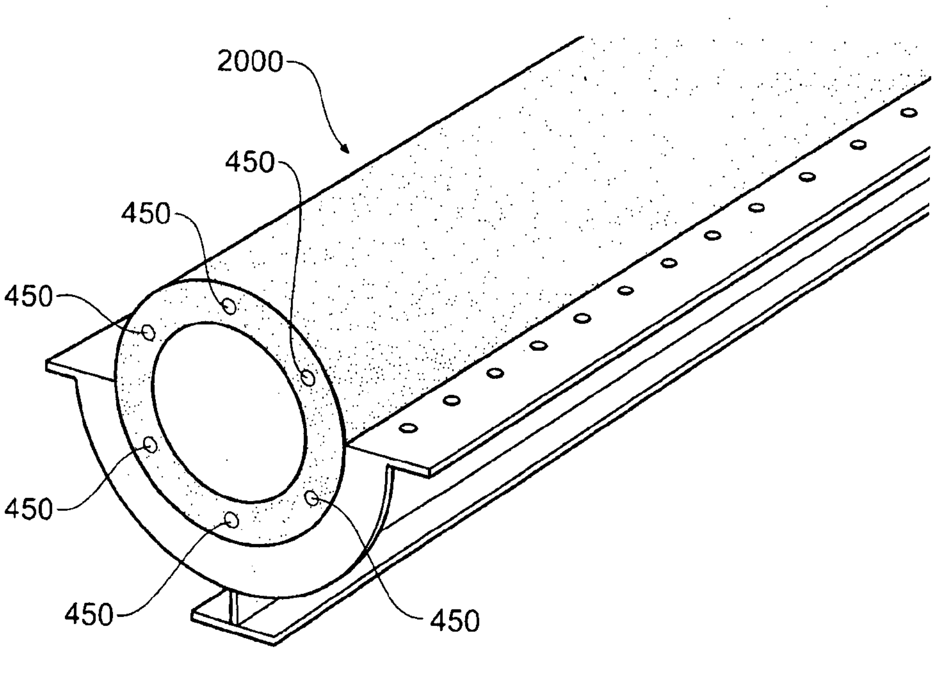
FIG. 14 is a front perspective view of the formed concrete pole sitting in the lower mould portion showing the tensioning elements in the wall of the pole.

Following final curing, the tensioning elements 450 may then be severed using suitable equipment such as a grinding disc, thereby transferring the tensile stress of tensioning elements 450 to the formed concrete pole 2000 from the first and second tensioning members. The barrel collar 300 and spigoted arbor housing 400 may then be removed from the external mould assembly 600 and any excess tensioning element material removed. As shown in FIG. 14, mould assembly 600 can then be opened by removing upper mould portion 610 to reveal formed concrete pole 2000 containing the tensioning elements 450 now cast into its wall.

A concrete support structure formed in accordance with the present invention provides a number of substantial advantages over other prior art methods.

The mould assembly and associated method of use described herein have relatively low capital costs for medium levels of production. The mould also does not require a high skill level for the manufacturer of poles and there is a relatively low labour component required. The mould arrangement is very portable and can therefore be set up very close to locations where the poles would be used so as to minimise transportation costs.

There are also improved safety benefits as there are no moving components as would be the case with rotation moulding as described above.

Further, the processes described herein eliminate the concrete laitance that is normally found on the internal surface of poles produced using the rotation moulding process.

Poles manufactured using the process described herein also have uniform inner and outer compression which means that the concrete matrix is homogeneous and not susceptible to cracking due to differential shrinkage. Bi-directional compression promotes superior bonds between reinforcing steel and concrete. The homogeneous concrete also promotes a constant water cement ratio so that the pole is not prone to differential shrinking and cracking. Further, the use of an inner core provides controlled concrete cover to the reinforcement used within the pole through being able to provide uniform wall thickness. The manufacturing process also enables uniform poles to be produced which perform well under test conditions.

It will be understood that the term "comprise" and any of its derivatives (eg. comprises, comprising) as used in this specification are to be taken to be inclusive of features to which it refers, and is not meant to exclude the presence of any additional features unless otherwise stated or implied.

The reference to any prior art in this specification is not, and should not be taken as, an acknowledgement of any form of suggestion that such prior art forms part of the common general knowledge.

Although illustrative embodiments of the present invention have been described in the foregoing detailed description, it will be understood that the invention is not limited to the embodiment disclosed, but is capable of numerous rearrangements, modifications and substitutions without departing from the scope of the invention as set forth and defined by the following claims.

The invention claimed is:

1. A method forming an elongate support structure, the support structure having a central hollow portion, the method including:

arranging an elongate core member to extend substantially horizontally, the elongate core member sized and shaped to correspond with the central hollow portion of the elongate support structure;

forming a core assembly by locating at a first end of the elongate core member a first tensioning member, the first tensioning member including a plurality of tensioning elements extending from the first end of the elongate core member along the outside of the elongate core member to a second tensioning member located at the second end of the elongate core member;

separating the first tensioning member from the second tensioning member by applying a separating force to increase a distance between the first and second tensioning members to be greater than a length an external mould assembly;

attaching the external mould assembly to the core assembly between the first and second tensioning members by releasing the separating force to allow the first and second tensioning members to abut against ends of the external mould assembly to form a combined mould and core assembly, the external mould assembly being sized and shaped to form a cavity extending around and along the elongate core member through which the plurality of tensioning elements extend through;

tensioning, the plurality of tensioning elements between the first and second tensioning, members, wherein the external mould assembly bears a compressive load caused by tensioning the plurality of tensioning elements;

positioning the combined mould and core assembly to a substantially upright orientation; and injecting concrete into the cavity formed between the elongate core member and the external mould assembly to form the elongate support structure.

2. The method of claim 1, wherein the applying of a separating force also straightens the tensioning elements between the first and second tensioning members.

3. The method of claim 1, wherein the concrete is injected from the bottom of the combined mould and core assembly.

4. The method of claim 1, wherein the tensioning of the plurality of tensioning elements involves tensioning with respect to the first tensioning member acting as a dead end with respect to a live end corresponding to the location of the second tensioning member.

5. The method of claim 1, wherein forming a core assembly includes threading a reinforcing cage structure onto the elongate core member located between the first and second tensioning members.

6. The method of claim 5, wherein the tensioning elements extend along the elongate core member external to the reinforcing cage structure.

7. The method of claim 5, wherein the reinforcing cage structure includes one or more fittings to provide attachment points on the firmed elongate support structure.

8. The method of claim 1, further including arranging a reinforcing member along the elongate core member.

9. The method of claim 8, wherein the reinforcing member is a helical wire that is extended along the elongate core member.

10. The method of claim 9, wherein the helical wire is extended external to the tensioning elements.

11. The method of claim 1, wherein the elongate support structure is a cylindrical pole and the central hollow portion is cylindrical.

12. The method of claim 1, wherein the elongate support structure is tapered.

13. The method of claim 1, wherein after injecting concrete into the cavity the elongate core member is partially removed from the combined mould and core assembly.

* * * * *